Oct. 1, 1929.   F. DUSTAN ET AL   1,730,063
CAR WHEEL BORER CHUCK
Filed July 2, 1927   3 Sheets-Sheet 3
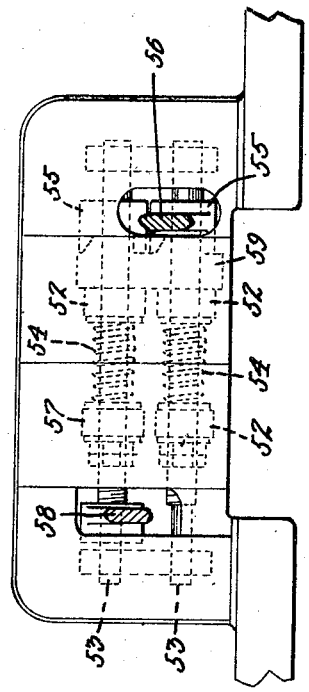
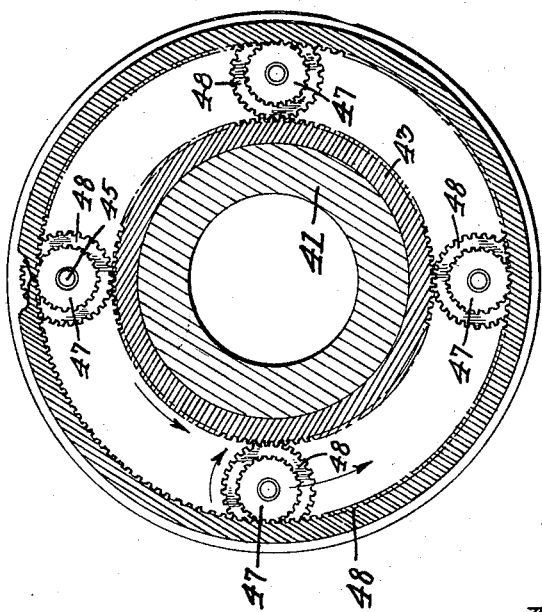

Patented Oct. 1, 1929

1,730,063

UNITED STATES PATENT OFFICE

FRANK DUSTAN AND RUSSELL P. SKIDMORE, OF FITCHBURG, MASSACHUSETTS, ASSIGNORS, BY MESNE ASSIGNMENTS, TO SHAW CRANE-PUTNAM MACHINE COMPANY, INC., A CORPORATION OF DELAWARE

CAR-WHEEL-BORER CHUCK

Application filed July 2, 1927. Serial No. 203,065.

This invention relates chiefly to a car wheel borer chuck of the type shown in the patent to Augustus Wood and Ernest L. Fickett, No. 1,531,327, patented March 31, 1925, but is applicable to any metal working tool in which the work is held on a rotary table or face plate by means of movable jaws.

The principal objects of this invention are to provide improvements in the type of chuck represented in said patent whereby the jaws are closed and opened by the power of the rotating support for holding the work and without the use of pneumatic, liquid, or any independent operating means; to provide a construction in which the table can always rotate in the same direction and its power will be transmitted for opening or closing the chuck without reversing the drive; to provide a chuck which will operate without any shock or jar and will grip the wheel with ample force to take the heaviest cuts; to provide a construction thus operated in which there will be no tendency for the chuck to open when stopping the machine for calipering or other operations, and, more specifically, to provide a construction in which, while the machine is running in the direction for boring or cutting, either one of two pedals can be operated, one to close the chuck and the other to open it, and no other action need be performed; and also after it is opened or closed the operating pedal can be released without changing the condition of the chuck.

Other objects and advantages of the invention will appear hereinafter.

It will be understood that while we have referred to the invention as a car wheel borer chuck, the invention is also capable of use for many types of boring, turning or grinding machines for heavy work.

Reference is to be had to the accompanying drawings in which

Fig. 4 is a horizontal sectional view on the line 4—4 of Fig. 1 showing the differential in plan; and Fig. 5 is a front view of the opening and closing pedal mechanism showing the pedal arms in section.

Figure 1:
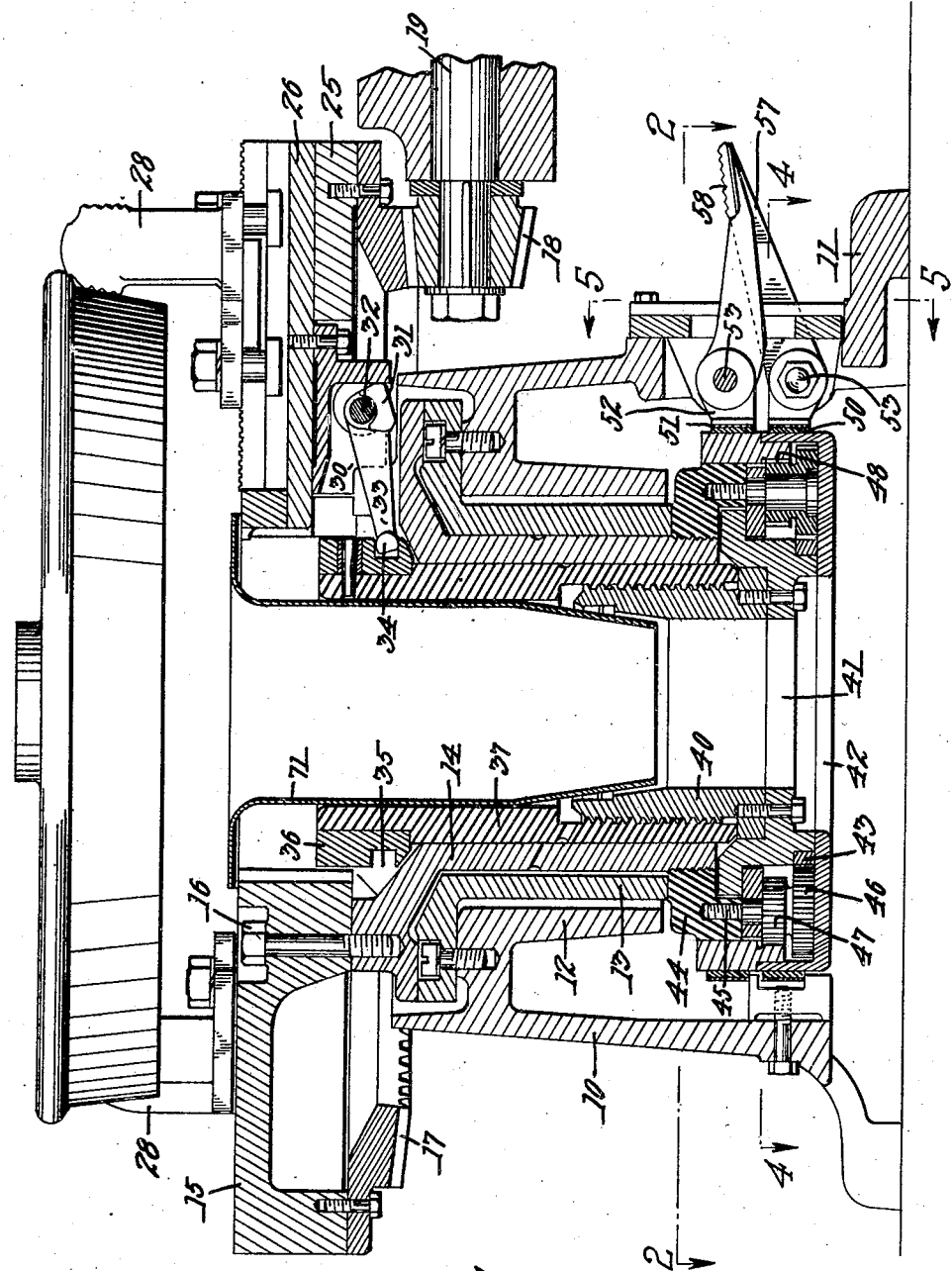
Fig. 1 is a central vertical sectional view of a car wheel boring machine comprising a preferred form of this invention, it being noted that the chuck is arranged with an odd number of jaws, as the central sectional view is taken through a jaw on one side and a space between the two jaws on the opposite side.
Figure 2:
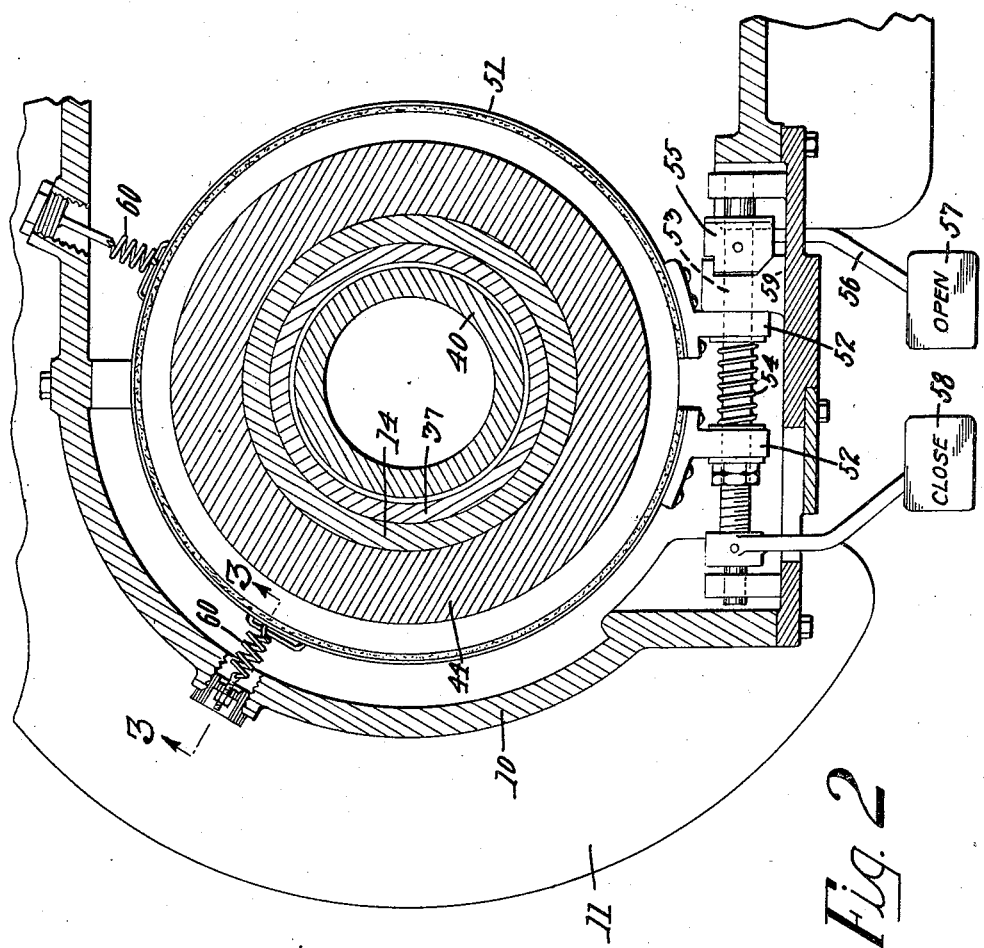
Fig. 2 is a horizontal sectional view on the line 2—2 of Fig. 1.
Figure 3:
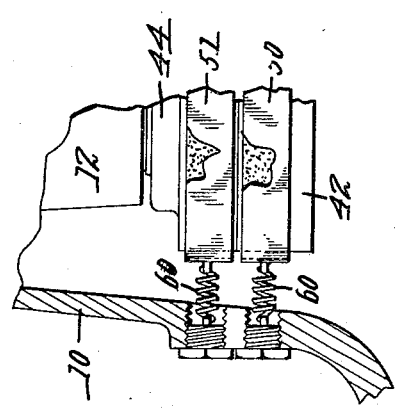
Fig. 3 is a horizontal sectional view on the line 3—3 of Fig. 2.

Referring now to the drawing, 10 denotes the boring mill frame which has a bed 11 provided with a vertical bearing at 12. The vertical bearing 12 has a bushing member 13 in which turns the tubular journal 14 to which the rotating element or table 15 is secured, as shown in Fig. 1, by means of bolts 16. On the under side of the table 15 there is secured the annular bevel gear 17 which engages with the bevel pinion 18 on the driving shaft 19, which is suitably journaled in the frame 10. The machine illustrated is provided with the usual boring bar for supporting the boring tool or other cutting tool.

The table 15 is provided with a plurality of radial guideways in each of which reciprocates a slide 26. These slides, are provided with gripping devices or chuck jaws 28, which are fitted and bolted thereto and are adapted to be drawn inwardly to grip the car wheel or other work in the table 15, holding it in place while being bored or otherwise machined.

The radial guideways 25 at their inner ends are cut away to form openings through the table 15, which openings are adapted to receive the inverted U-members 30 that are secured on the bottom at the inner ends of each of the slotted slides. Each U-member has its legs engaged by cams 31 pivoted on a shaft 32, which is located in the opening in the table 15 below the path of the slotted slide. These cams 31 on the shafts 32 are made fast to and are operated by cam levers 33 and they are shown as eccentrics as far as their operative surfaces are concerned to control the motion of the slides so as to ease up on the motion and slow it down as the jaws grip the work. These cam levers have their free ends projecting inwardly toward the vertical axis about which the table 15 revolves. They terminate at a predetermined distance from the vertical axis, preferably with a thickened portion 34 which is adapted to ride in an annular groove 35 formed in the collar 36, which latter is secured on the upper end of the cylindrical plunger 37.

The plunger 37 in accordance with the practice of this invention is power-actuated independently of any starting or driving mechanism, and is arranged in coaxial relation with the vertical axis about which the table 15 turns, and is preferably so mounted that it rotates with and is carried by the tubular journal 14. A stop for the plunger 37, in its downward movement, is provided on the collar of the screw 40 hereinafter described.

It will be understood that in the ordinary operation of the machine, the table 15 is rotated by the gear 17 and pinion 18 in such a direction that the boring tool (not shown) will bore out the center of a car wheel. This rotation is maintained at all times in a forward or cutting direction and the machine is never reversed. It is designed to operate the chuck jaws by the power of the rotating table while rotating in its forward direction either to release or close the jaws on the work. Then without any change in the direction or speed of rotation of the table, the jaws will stay either open or closed in accordance with the operation of the closing and opening means, though the same are released.

The rotation of the table takes with it the tubular journal 14, which is secured to it by the screws 16, and also the U-members 30, cam levers 33, grooved collar 36, and plunger 37. The bushing member 13 remains stationary with the frame 10 and the vertical bearing 12.

The plunger 37 is internally screw-threaded at its lower end for engagement with the screw 40, which normally rotates with the plunger and journal and carries a frame 41, secured to it by screws, or in any other desired way. This frame 41 is provided with an external gear 43 and has secured to it a casing 42 which has an outer cylindrical surface. The parts 41, 42 and 43 therefore rotate with the screw 40 in the normal operation of the device, but, if for any reason they are stopped, the plunger 37 will be moved vertically by its engagement with the screw 40.

Positively connected with the journal 14 is a ring 44 which carries studs 45 on which are loosely journalled pairs of planetary gears or pinions 46 and 47 positively, and preferably integrally, fixed together. They run freely on a bushing on the head of each stud 45. Normally it will be observed these studs 45 are running with the journal 14 and with the table. The gear or pinion 47 meshes with an internal gear 48 which is free to turn and is not positively held but, under ordinary circumstances, turns with the other parts that have just been described.

The casing 42 and the gear 48 have external cylindrical surfaces with which a pair of brake-bands 50 and 51 are adapted to engage. Normally of course these brake-bands are loose and do not affect the operation in any way.

We have also shown equalizing and supporting means for the brake-band in the form of springs 60 placed at intervals and adjustably secured in the frame.

The chips from the work are allowed to fall down through the table into a pit underneath the machine. A guard 71 is held to the table by screws and rotates with it. This protects the working parts of the chuck from falling chips. It will be noticed also that the differential gear mechanism and screw are all enclosed in the casing 42 and gear 48 which are connected with the other parts so that there is no chance for the chips or dirt to get into the gears. The gearing is flooded with oil at all times but the oiling mechanism is not shown herein as it does not constitute a part of this invention.

Each of these brake-bands is provided with two projections 52 through which passes a rod 53 provided with a screw-thread and nuts for adjustment and the projections 52, in each case, are held apart by a spring 54. The rod has pinned to it a cam 55 which has an arm 56 provided with a pedal 57 in one case and 58 in the other. The close pedal 58 is the one now being described. The cam 55 works on a cam surface on a fixed bracket 59 carried by the frame. Therefore, the depression of the pedal 58 turns the cam 55 and moves the rod 53 longitudinally against the opposition of the spring 54 to tighten the brake-band 51. As the casing 42 and connected parts comprising the gear 43 are rotating, the slowing up and stopping of the gear 48 will cause a planetary rotating motion to be transmitted through the pinions 46 and 47 to the screw 40 and cause that to continue to rotate in the same direction as the journal 14 but at a higher speed. Therefore the plunger 37 will rise and swing the arms 33 to close the chuck jaws 28. On the other hand, if the "open" pedal 57 is depressed, it will close the brake-band 50 about the casing 42 and stop the casing and also stop the rotation of the screw 40. This will cause the plunger 37 to descend and open the chuck.

The operation having been described in the course of the description, we will merely say that this furnishes a practical and efficient means for operating the chuck of a machine of this type by the power of the machine itself and without the use of any additional power except that of pressing on a treadle. The machine is started up and the work put between the jaws which are open. After the table is rotated a few turns, the treadle 58 is depressed and the jaws closed as stated above. The release of the treadle will allow its spring 54 to raise it but that will not affect the jaws. They will remain closed and their force will not be reduced in any way. When the boring operation has been completed, the treadle 57 is depressed and the jaws opened while the table continues to rotate. If the table is stopped for any reason, it will not release the work from the jaws.

Although we have illustrated and described only a single form of the invention we are aware of the fact that modifications can be made therein by any person skilled in the art without departing from the scope of the invention as expressed in the claims.

Therefore, we do not wish to be limited to the details of construction herein shown and described, but what we do claim is:

1. In a chuck jaw operating device for a machine tool, the combination with the chuck jaws and means for opening and closing them comprising a member having a screw-thread rotatable with the work, a screw meshing with said thread and normally rotating with the work, a frame on which said screw is fixed, means for rotating said frame with the work, said frame having a cylindrical surface, an internal gear also having a cylindrical surface, a pair of planet gears rotatable on an axis which normally rotates with the work and fixed together, one smaller than the other and meshing with said internal gear, an external gear on said frame meshing with the larger planetary gear, whereby the differential gearing will normally rotate with the work and whereby, when the internal gear is stopped, the screw will be rotated in the same direction as the work by the differential gearing but at a higher speed, and whereby when the frame is stopped, the screw will stop, a brake-band on the frame and one on the internal gear, and two foot treadles each connected with one of said brake-bands for tightening them individually, whereby when one foot treadle is depressed, the chuck will be opened and when the other foot treadle is depressed, the chuck will be closed.

2. In a chuck jaw operating device for a machine tool, the combination with the chuck jaws and means for opening and closing them comprising a member having a screw-thread rotatable with the work, a screw meshing with said thread and normally rotating with the work, a frame on which said screw is fixed, means for rotating said frame with the work, an internal gear, a pair of planet gears rotatable on an axis which normally rotates with the work and fixed together, one smaller than the other and meshing with said internal gear, an external gear on said frame meshing with the larger planetary gear, whereby the differential gearing will normally rotate with the work and whereby, when the internal gear is stopped, the screw will be rotated in the same direction as the work by the differential gearing but at a higher speed, and whereby when the external gear is stopped the screw will stop, and means for individually stopping the external gear to close the chuck and stopping the frame to open the chuck.

3. In a machine tool, a rotary work table, chuck jaws slidable radially thereon, a hollow internally threaded plunger centrally mounted for axial movement relatively to said table and normally rotating therewith, means between said plunger and said jaws to slide the latter when said plunger moves vertically, a member threaded into said plunger and normally rotating therewith but held against vertical movement, a frame secured to said member and having external gear teeth thereon, an internal gear normally rotating with the table, differential gearing carried by said table and interposed between said internal gear and said gear teeth, brake means to retard the rotation of said frame, brake means to retard the rotation of said internal gear, and independent pedals to actuate said brake means, whereby the actuation of one of said pedals will accelerate the rotation of said screw-threaded member, thereby imparting a vertical movement to said plunger and a closing movement to said jaws, and the actuation of the other pedal will retard the rotation of said screw-threaded member, thereby moving the plunger and the jaws in the opposite direction.

4. In a machine tool, the combination with a rotary work table and chuck jaws slidable radially thereon, of means, operable from said table, to slide said jaws in either direction, said means comprising an internally threaded sleeve rotating with said table but movable axially thereof, an externally threaded member normally rotating with said sleeve but held against axial movement, the threads of said sleeve and member being in engagement, an external gear on said member, an internal gear normally rotating with said sleeve, independent brake means to retard said member and internal gear, differential gearing between said gears, and means to actuate said brake means, whereby when one brake is operated, said member is accelerated to move said sleeve axially to close said jaws, and when the other brake is operated, said member is retarded to move said sleeve axially in the other direction to open the jaws.

In testimony whereof we have hereunto affixed our signatures.

FRANK DUSTAN,
RUSSELL P. SKIDMORE.